(12) United States Patent
Soejima et al.

(10) Patent No.: US 10,728,416 B1
(45) Date of Patent: Jul. 28, 2020

(54) INFORMATION PROCESSING APPARATUS SENDING A FAX WITH DESTINATION IDENTIFICATION INFORMATION AND NON-TRANSITORY COMPUTER READABLE MEDIUM

(71) Applicant: FUJI XEROX CO., LTD., Tokyo (JP)

(72) Inventors: Hideki Soejima, Kanagawa (JP); Hirotaka Kawabata, Kanagawa (JP); Hideki Fujii, Kanagawa (JP); Manabu Wada, Kanagawa (JP); Satoshi Watanabe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/521,093

(22) Filed: Jul. 24, 2019

(30) Foreign Application Priority Data

Mar. 22, 2019 (JP) .................. 2019-055614

(51) Int. Cl.
*H04N 1/00* (2006.01)
*H04N 1/23* (2006.01)

(52) U.S. Cl.
CPC ........... *H04N 1/233* (2013.01); *H04N 1/2338* (2013.01)

(58) Field of Classification Search
None
See application file for complete search history.

(56) References Cited

U.S. PATENT DOCUMENTS 5,461,488 A * 10/1995 Witek ................ H04N 1/00204
358/402
2013/0003114 A1 * 1/2013 Maehira ............. H04N 1/00206
358/1.15

FOREIGN PATENT DOCUMENTS

JP        H09-261377 A       10/1997

OTHER PUBLICATIONS

Machine translation of Japanese Publ. No. H0961377 to Noguchi, published on Oct. 3, 2997.*

* cited by examiner

*Primary Examiner* — Paul F Payer
(74) *Attorney, Agent, or Firm* — Oliff PLC

(57) ABSTRACT

An information processing apparatus includes a sending unit and a controller. The sending unit sends a fax to a destination. The controller executes control for printing identification information for identifying the destination in accordance with selection made by a sender of the fax on paper output at the destination in response to sending of the fax. In a case where the sender of the fax selects a destination name as the identification information, if the destination name is unprintable as it is on the paper, the controller executes control for printing a phone number of the destination as the identification information on the paper.

8 Claims, 6 Drawing Sheets

FIG. 3

| ID | DESTINATION NAME | PHONE NUMBER | TO-BE-PRINTED DESTINATION IDENTIFICATION INFORMATION |
|---|---|---|---|
| 1 | AAA | 0123456789 | AAA |
| 2 | BBB | 1234567890 | ABCDEF |
| 3 | CC | 2345678901 | CCCCCC |
| 4 | DDDD | 3456789012 | |
| ... | ... | ... | ... |

| ID | DESTINATION NAME | PHONE NUMBER |
|---|---|---|
| 1 | AAA | 0123456789 |
| 2 | BBB | 1234567890 |
| 3 | CC | 2345678901 |
| 4 | DDDD | 3456789012 |
| ... | ... | ... |

OK   CANCEL

TO-BE-PRINTED DESTINATION IDENTIFICATION INFORMATION TO BE PRINTED AT DESTINATION IS NOT REGISTERED IN DESTINATION MANAGEMENT TABLE.
PLEASE SELECT TO-BE-PRINTED DESTINATION IDENTIFICATION INFORMATION.

☐ DESTINATION NAME

☐ PHONE NUMBER

[ OK ]   [ CANCEL ]

DESTINATION NAME IS UNPRINTABLE AS IT IS. INFORMATION TO BE PRINTED IS CHANGED TO DESTINATION'S PHONE NUMBER.

[ OK ]   [ CANCEL ]

WOULD IT BE PROBLEM IF CHARACTER STRING ENTERED IN SETTING FIELD OF DESTINATION NAME IS PRINTED AT DESTINATION?

CHARACTER STRING TO BE PRINTED
DDDD

| PROBLEM | NO PROBLEM |

INFORMATION PROCESSING APPARATUS SENDING A FAX WITH DESTINATION IDENTIFICATION INFORMATION AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-055614 filed Mar. 22, 2019.

BACKGROUND (i) Technical Field

The present disclosure relates to an information processing apparatus and a non-transitory computer readable medium.

(ii) Related Art

In response to execution of fax sending, identification information for identifying a destination to where the fax is sent may sometimes be printed on paper output at the destination. For example, a destination name or the like may be printed as the identification information to enable a user at the destination to know to whom the fax is sent.

Japanese Unexamined Patent Application Publication No. 9-261377 describes a fax terminal that sends a transmission document signal combined with header information including a destination name and a sender name.

By the way, in the case where the sender of a fax is allowed to select identification information to be printed at the destination, if the sender selects a destination name as identification information, the destination name may not be printed as it is due to the limitation of the number of characters, the limitation of character code, or the like. As a result, a user at the destination may not be able to know to whom the fax is sent.

SUMMARY

Aspects of non-limiting embodiments of the present disclosure relate to allowing a user at a destination to know to whom a fax is sent even in the case where the destination name is unprintable as it is on paper output at the destination of the sent fax.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a sending unit and a controller. The sending unit sends a fax to a destination. The controller executes control for printing identification information for identifying the destination in accordance with selection made by a sender of the fax on paper output at the destination in response to sending of the fax. In a case where the sender of the fax selects a destination name as the identification information, if the destination name is unprintable as it is on the paper, the controller executes control for printing a phone number of the destination as the identification information on the paper.

BRIEF DESCRIPTION OF THE DRAWINGS

An exemplary embodiment of the present disclosure will be described in detail based on the following figures, wherein:

FIG. 3 is a diagram illustrating a destination management table;
FIG. 4 is a diagram illustrating a screen;
FIG. 8 is a diagram illustrating a screen;
FIG. 9 is a diagram illustrating a screen;
FIG. 11 is a diagram illustrating a screen.

DETAILED DESCRIPTION

Figure 1:
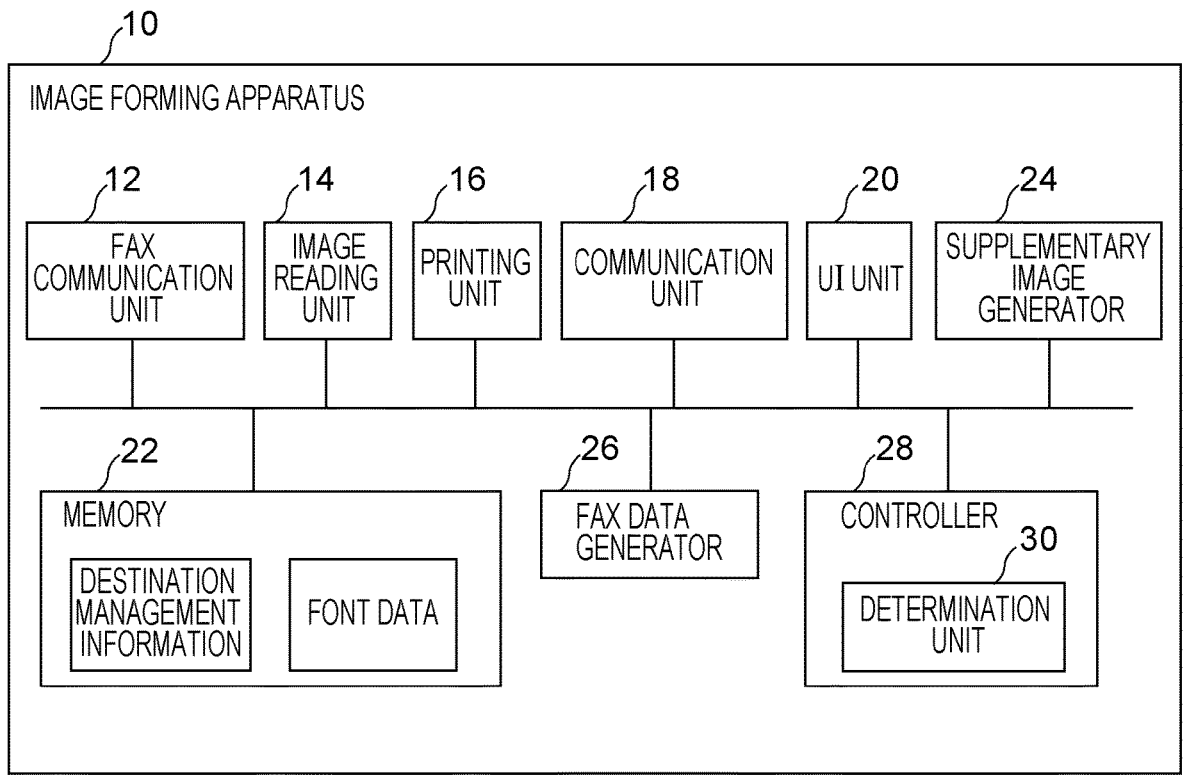
FIG. 1 is a block diagram illustrating the configuration of an image forming apparatus according to an exemplary embodiment.

Hereinafter, an image forming apparatus according to an exemplary embodiment will be described with reference to FIG. 1. FIG. 1 is a diagram illustrating an exemplary configuration of an image forming apparatus 10 according to the present exemplary embodiment. The image forming apparatus 10 according to the present exemplary embodiment corresponds to an example of an information processing apparatus. The image forming apparatus 10 is an apparatus with a fax communicating function. The image forming apparatus 10 may be a fax machine dedicated for fax communication, or may be a multifunctional peripheral that also has an image forming function in addition to a fax communicating function.

A fax communication unit 12 is configured to communicate, via fax, fax data through a communication line in accordance with a fax communication standard. The fax communication unit 12 has, for example, the function to send, via fax, fax data to a destination, and the function to receive, via fax, fax data sent via fax from another apparatus which is the sending source. As the fax standard, for example, G3, G4, IP fax, or Internet fax may be used. Needless to say, other standards may be used.

Fax data includes to-be-sent image data, which is a target of fax sending, and supplementary image data. The to-be-sent image data and the supplementary image data are image data such as bitmap data. The to-be-sent image data is image data generated by, for example, reading done by a later-described image reading unit 14. The to-be-sent image data may be image data sent from another apparatus to the image forming apparatus 10. The supplementary image data is image data that represents supplementary information, and is image data sent via fax as an attachment to the to-be-sent image data. The supplementary information is information that at least includes information for identifying a destination. The supplementary image data is image data printed in a supplementary image area on a recording medium such as paper output at the destination of the sent fax, or image data printed on specific paper output at the destination. The supplementary image area is, for example, an upper end area of the paper. For example, an area called the header corresponds to an example of the supplementary image area. The specific paper is, for example, dedicated paper on which the supplementary image data is printed. The supplementary image data will be described in detail later.

The image reading unit 14 is, for example, a camera or a scanner, and is configured to generate image data that represents a document by reading the document. For example, image data that represents a document to be sent via fax is generated by reading the document by the image reading unit 14. The image data is included as to-be-sent image data in fax data.

A printing unit 16 is a printer, and is configured to print an image based on to-be-printed image data on a recording medium such as paper. For example, in the case where the fax communication unit 12 receives fax data via fax, the printing unit 16 prints an image based on the fax data on paper. In doing so, a to-be-sent image based on the to-be-sent image data and a supplementary image based on the supplementary image data are printed on paper.

A communication unit 18 is a communication interface, and has the function to send information to another apparatus and the function to receive information from another apparatus. The communication unit 18 may have a wireless communication function such as Wi-Fi (registered trademark), or a wired communication function. The communication unit 18 may communicate with another apparatus via a network such as a local area network (LAN) or a communication channel such as the Internet, or may communicate with another apparatus by using near field communication such as Bluetooth (registered trademark).

A UI unit 20 is a user interface unit, and includes a display and an operation unit. The display is a display device such as a liquid crystal display (LCD). The operation unit is an input device such as a keyboard, input keys, and/or an operation panel. The UI unit 20 may be a UI unit such as a touchscreen that has both a display and an operation unit.

Memory 22 includes one or more storage areas that store various types of information. The storage areas include, for example, one or more storage devices (physical drives such as a hard disk drive and memory) provided in the image forming apparatus 10. For example, fax data to be sent via fax and fax data received via fax are stored in the memory 22.

Destination management information is stored in the memory 22. The destination management information is information for managing a phone number or the like of a destination. In the destination management information, for each destination, for example, destination name information indicating the destination name, phone number information indicating the phone number of the destination, and to-be-printed destination identification information are associated. Each of the pieces of information included in the destination management information may be registered by the user in the destination management information, or may be input from an apparatus other than the image forming apparatus 10 to the image forming apparatus 10 and registered in the destination management information. For example, in the case where the image forming apparatus 10 is replaced with a new one, destination management information stored in the old image forming apparatus 10 may be input to the new image forming apparatus 10 and may be stored there.

The destination name information is information indicating, for example, the name, abbreviation, or nickname of the destination. Needless to say, other information may be registered by the user as the destination name information.

The to-be-printed destination identification information is information for identifying the destination of a to-be-sent fax, and is information printed on paper output at the destination of the to-be-sent fax. The to-be-printed destination identification information need not be registered in the destination management information. For example, the user may sometimes not register the to-be-printed destination identification information in the destination management information. In addition, in the case where the image forming apparatus 10 is replaced with a new one, to-be-printed destination identification information may sometimes not be input from the old image forming apparatus 10 to the new image forming apparatus 10, and furthermore, the user may sometimes not register to-be-printed destination identification information in the destination management information. To-be-printed destination identification information may be registered or not registered depending on the destination.

The sender of a fax is allowed to select a destination registered in the destination management information as the destination of the to-be-sent fax.

In addition, font data is stored in the memory 22. For example, a combination of character code and information indicating the type of font is associated with glyph data representing the shape of a character indicated by the character code by the font, and these pieces of information are stored as font data in the memory 22. As glyph data, for example, outline font data or bitmap font data is used. For example, outline font data is used as glyph data for representing characters displayed on the display of the UI unit 20. In addition, bitmap font data is used as glyph data for representing characters represented by the later-described supplementary image data. Needless to say, outline font data may be used as glyph data representing characters represented by the supplementary image data.

A supplementary image data generator 24 is configured to generate supplementary image data included in fax data. The supplementary image data is image data representing supplementary information. The supplementary information at least includes to-be-printed destination identification information. For example, the to-be-printed destination identification information is represented by a character string, and the supplementary image data is image data that at least represents the character string.

The supplementary information may further include sender identification information for identifying the sender of a fax, date and time information indicating the date and time of sending of the fax, and information indicating a document number. The sender identification information is, for example, information indicating the name, phone number, or the like of the sender of a fax. The fax sender, the fax sending date and time, and the like are represented by character strings, and these character strings are represented in the supplementary image data. Note that information included in the supplementary information may be selected by the sender of a fax or by another user, or may be determined in advance. In the case where information included in the supplementary information is selected by the sender of a fax or by another user, the supplementary image data generator 24 generates supplementary information including the selected information.

The supplementary image data generator 24 obtains, for each character included in a character string representing supplementary information, glyph data associated with a combination of character code indicating the character and the type of font used in representing the character from the memory 22, and, using the glyph data of each character, generates supplementary image data representing the character string.

A fax data generator 26 generates fax data by combining to-be-sent image data to be sent via fax and supplementary image data generated by the supplementary image data generator 24. The to-be-sent image data may be image data generated by reading a document by the image reading unit 14, or image data sent from another apparatus to the image forming apparatus 10.

A controller 28 is configured to control the operation of each unit of the image forming apparatus 10. In addition, the controller 28 includes a determination unit 30.

The determination unit 30 is configured to determine to-be-printed destination identification information included in supplementary information. The supplementary image data generator 24 generates supplementary image data representing supplementary information including the to-be-printed destination identification information determined by the determination unit 30.

For example, in the case where the sender of a fax selects the destination of a to-be-sent fax from the destination management information, if to-be-printed destination identification information is registered in association with the selected destination in the destination management information, the determination unit 30 determines the registered to-be-printed destination identification information as information to be included in supplementary information.

In the case where no to-be-printed destination identification information is registered in association with a destination selected by the sender of a fax in the destination management information, the determination unit 30 determines, in accordance with a predetermined priority or selection made by the sender of the fax, destination name information associated with the destination or phone number information associated with the destination as to-be-printed destination identification information to be included in supplementary information.

In the case where destination name information is determined as to-be-printed destination identification information to be included in supplementary information in accordance with the priority or selection made by the sender of the fax, if a destination name indicated by the destination name information satisfies a specific condition, the controller 28 executes control for printing phone number information associated with the destination, instead of the destination name, as to-be-printed destination identification information on paper output at the destination. Specifically, the determination unit 30 determines, instead of the destination name, phone number information associated with the destination as to-be-printed destination identification information to be included in supplementary information. In the case where the destination name does not satisfy the specific condition, the determination unit 30 determines the destination name information as to-be-printed destination identification information to be included in supplementary information.

The case in which the destination name satisfies the specific condition is the case in which the destination name is unprintable as it is on paper output at the destination of the sent fax. The specific condition is, for example, a condition regarding a character limit or a condition regarding character code. For example, in the case where the number of characters representing a destination name exceeds a predetermined threshold, the destination name satisfies the specific condition. In addition, in the case where the character code of each character in a character string representing a destination name does not support character code used in fax sending, that is, in the case where glyph data associated with the character code of each character is not stored in the memory 22, the destination name satisfies the specific condition. These processes will be described in detail later.

Note that an apparatus at the destination of the sent fax includes, for example, the fax communication unit 12, the image reading unit 14, the printing unit 16, the UI unit 20, memory, and a controller. The apparatus at the destination may be an apparatus that has the same configuration as the image forming apparatus 10. In the apparatus at the destination, the fax communication unit 12 receives, via fax, fax data sent via fax from the image forming apparatus 10, which is the fax sending source, and the printing unit 16 prints an image (that is, a to-be-sent image and a supplementary image) based on the fax data on paper.

Hereinafter, a specific example of the image forming apparatus 10 will be described in more detail.

Figure 2:
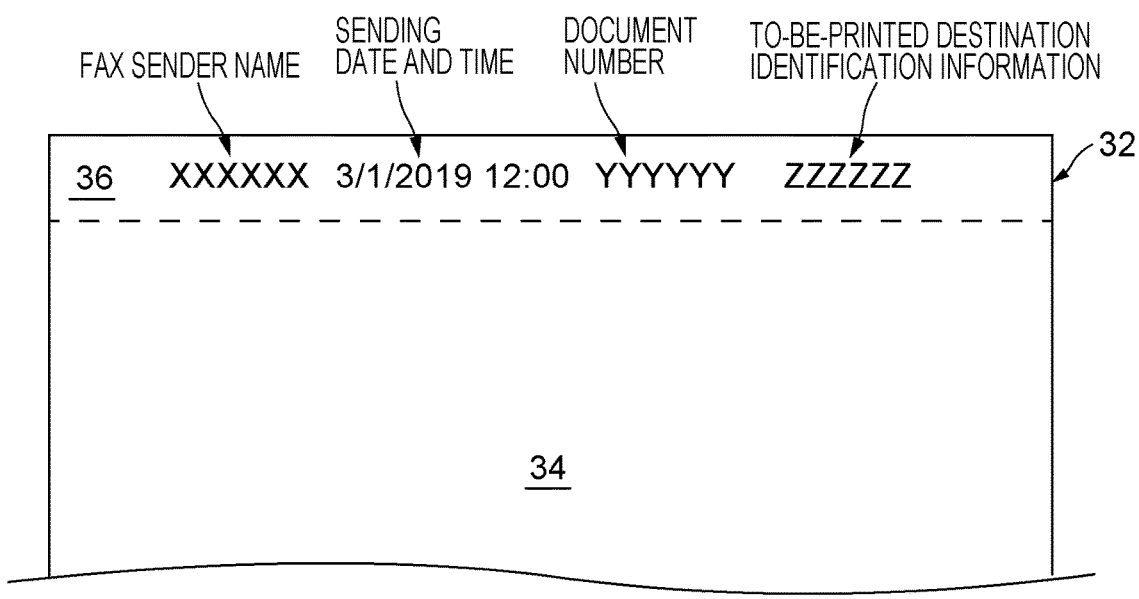
FIG. 2 is a diagram illustrating paper.

FIG. 2 illustrates an example of paper output at the destination of the sent fax. Note that FIG. 2 illustrates part of paper 32. A to-be-sent image area 34 on the paper 32 is an area where a to-be-sent image based on to-be-sent image data included in fax data is printed. A header area 36 on the paper 32 is an area where a supplementary image based on supplementary image data included in the fax data is printed. The header area 36 is an area in the upper end portion of the paper 32, and corresponds to an example of a supplementary image area. A supplementary image representing each piece of information included in supplementary information is printed in the header area 36. For example, a character string representing the sender of a fax (that is, sender name), a character string representing the sending date and time, a character string representing a document number, and a character string representing to-be-printed destination identification information are printed in the header area 36. Note that the supplementary information illustrated in FIG. 2 is only one example, and other information (such as the phone number of the sender of a fax) may be printed in the header area 36.

The fax data generator 26 combines supplementary image data with to-be-sent image data such that a supplementary image will be printed in the header area 36. For example, the fax data generator 26 combines supplementary image at the head portion of to-be-sent image data.

Although the to-be-sent image area 34 and the header area 36 do not overlap in the example illustrated in FIG. 2, all or part of the header area 36 may be set to overlap the to-be-sent image area 34. In this case, all or part of a supplementary image is printed over a to-be-sent image.

The header area 36 is only one example of a supplementary image area, and an area at the bottom portion or an area at a side portion of the paper may be defined as a supplementary image area. In this case, the fax data generator 26 combines supplementary image data with to-be-sent image data such that a supplementary image will be printed in this supplementary image area. Note that the fax data generator 26 may process supplementary image data and combine this with to-be-sent image data.

Alternatively, instead of printing a supplementary image in the header area 36, a supplementary image may be printed on dedicated paper different from paper on which a to-be-sent image is printed. The dedicated paper is, for example, paper on which the subject, destination name, fax sender name, sending date and time, contact address, outline, the number of sent pages, and so forth are printed, and is paper which is generally called a cover letter or a transmission sheet.

FIG. 3 illustrates an example of a destination management table. Data in the destination management table corresponds to an example of destination management information.

The destination management table includes a setting field of the destination name, a setting field of the phone number of the destination, and a setting field of to-be-printed destination identification information. In the destination management table, a management ID, information indicating the destination name, information indicating the phone number of the destination, and to-be-printed destination identification information are associated with each destination. The destination name, phone number, and to-be-printed destination identification information may be registered by the user in the destination management table, or may be sent from another apparatus to the image forming apparatus 10 and registered in the destination management table. In addition, the user may change or delete each of the pieces of information registered in the destination management table. The setting field of to-be-printed destination identification information corresponds to an example of a setting field of identification information.

In the example illustrated in FIG. 3, to-be-printed destination identification information is registered for each of destinations with the management IDs "1" to "3". No to-be-printed destination identification information is registered for the destination with the management ID "4". Information entered in the setting field of to-be-printed destination identification information may be the same as or different from information entered in the setting field of the destination name. Information entered in the setting field of the destination name is assumed to be information for the fax sender to recognize the destination. Information entered in the setting field of to-be-printed destination identification information is information printed on paper output at the destination of the sent fax, and is assumed to be information for the recipient of the fax to recognize the destination of fax data. Therefore, it is assumed that information for the fax sender to recognize the destination by himself/herself is entered in the setting field of the destination name, and information for the fax recipient to recognize the destination is entered in the setting field of to-be-printed destination identification information.

A character string is entered in each setting field. Characters entered here are symbols with character code, and may be, for example, symbols indicating language or symbols indicating pictures or figures other than language. For example, characters called special characters may be entered. In addition, there is no particular restriction on the standard of character code to be used.

For example, the destination with the management ID "1" is such that the character string "AAA" is entered in both of the setting field of the destination name and the setting field of to-be-printed destination identification information. In addition, the destination with the management ID "2" is such that the character string "BBB" is entered in the setting field of the destination name, and the character string "ABCDEF" is entered in the setting field of to-be-printed destination identification information.

FIG. 4 illustrates a display example of a destination table. For example, in response to an instruction given by the fax sender using the UI unit 20 to display the destination table, the controller 28 causes the display of the UI unit 20 to display the destination table. For example, as illustrated in FIG. 4, the destination table is displayed on a screen 38 of the display. The destination table represents a list of destination names and phone numbers of the individual destinations. The destination name and phone number of each destination are pieces of information registered in the destination management table. Note that to-be-printed destination identification information may also be included in the destination table and displayed.

When the fax sender selects a destination from the destination table, the controller 28 sets the destination selected by the fax sender as the destination of a to-be-sent fax. When the fax sender gives an instruction to execute fax sending using the UI unit 20, the fax communication unit 12 sends fax data via fax to the phone number of the set destination. At the destination, a to-be-sent image and a supplementary image based on the fax data are printed on paper.

For example, in the case where the fax sender selects a destination whose to-be-printed destination identification information is set in the setting field of to-be-printed destination identification information, the to-be-printed destination identification information is printed in the header area 36 of the paper 32 output at the destination of the sent fax.

Figure 5:
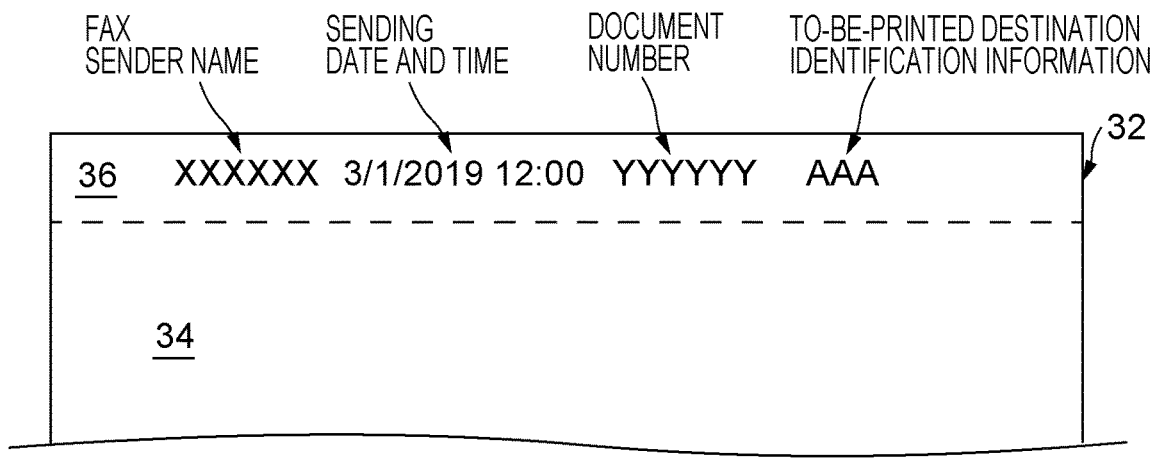
FIG. 5 is a diagram illustrating paper.

Referring to FIG. 5, a specific example will be described. FIG. 5 illustrates an example of paper output at the destination of the sent fax. For example, the destination with the management ID "1" is such that the character string "AAA" is entered in the setting field of to-be-printed destination identification information, and the to-be-printed destination identification information is set in this setting field. Therefore, in the case where the destination with the management ID "1" is selected as the destination of a to-be-sent fax, the to-be-printed destination identification information indicating the character string "AAA" is included in supplementary information, and, as illustrated in FIG. 5, a supplementary image including an image that represents the character string "AAA" is printed in the header area 36.

In contrast, in the case where the fax sender selects a destination whose to-be-printed destination identification information is not set in the setting field of to-be-printed destination identification information, the determination unit 30 determines to-be-printed destination identification information in accordance with a predetermined priority or selection made by the fax sender. The priority may be, for example, determined in advance by the fax sender or by another user, or may be determined on the basis of the use log of to-be-printed destination identification information.

Figure 6:
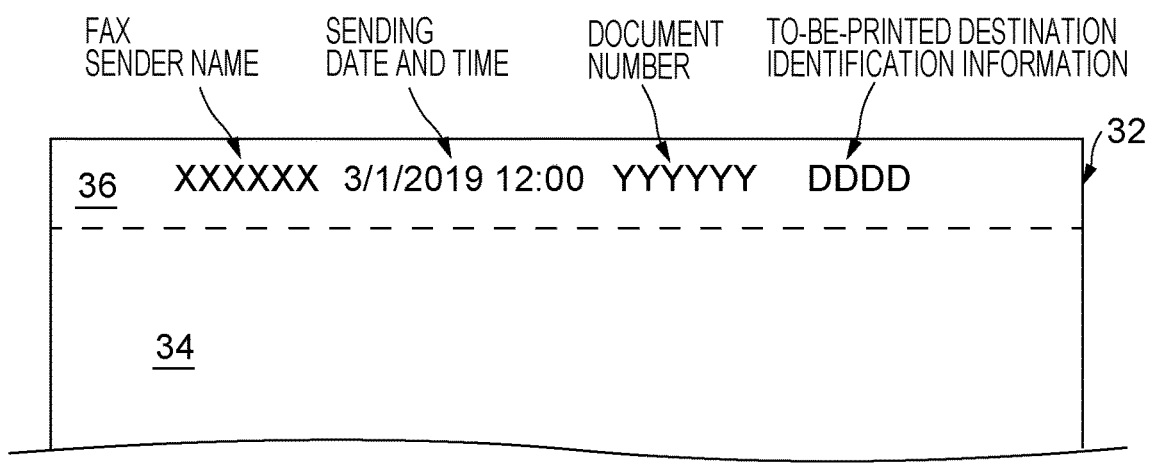
FIG. 6 is a diagram illustrating paper.
Figure 7:
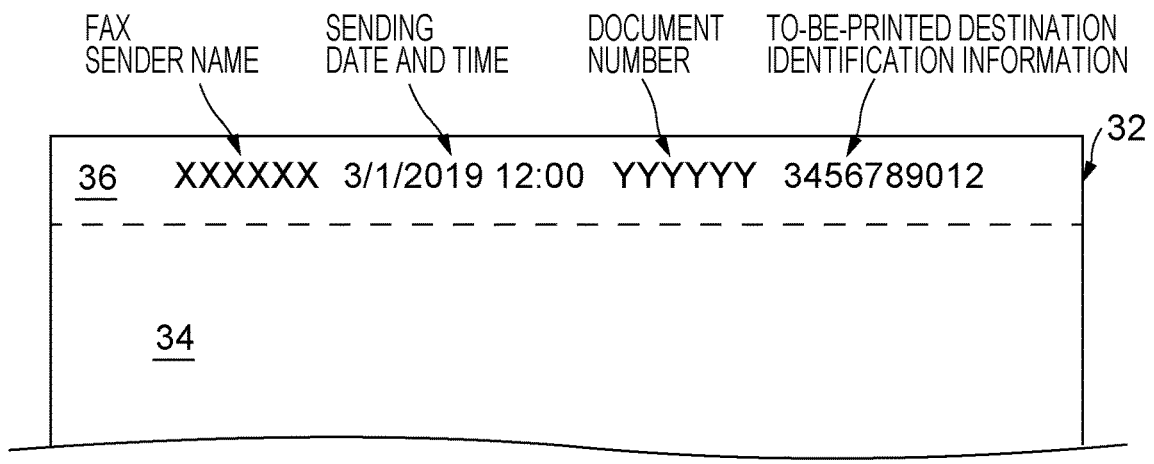
FIG. 7 is a diagram illustrating paper.

Referring to FIGS. 6 and 7, specific examples will be described. FIGS. 6 and 7 illustrate examples of paper output at the destination of the sent fax. The destination with the management ID "4" is such that no character string is entered in the setting field of to-be-printed destination identification information, and no to-be-printed destination identification information is set in this setting field. Therefore, the determination unit 30 determines to-be-printed destination identification information in accordance with a priority or selection made by the fax sender.

For example, in the case where a priority is determined in advance, the determination unit 30 determines to-be-printed destination identification information in accordance with the priority. Note that information indicating the priority is stored in advance in the memory 22. In the case where the priority of a destination name is higher than the priority of a phone number, if the destination name of a destination selected by the fax sender is registered in the destination management table, the determination unit 30 determines information indicating the destination name of the destination selected by the fax sender as to-be-printed destination identification information. Since the destination name of the destination with the management ID "4" is "DDDD", information indicating the character string "DDDD" is determined as to-be-printed destination identification information. In this case, to-be-printed destination identification information indicating the character string "DDDD" is included in supplementary information, and, as illustrated in FIG. 6, a supplementary image including an image that represents the character string "DDDD" is printed in the header area 36.

In the case where the priority of a phone number is higher than the priority of a destination name, the determination unit 30 determines information indicating the phone number of a destination selected by the fax sender as to-be-printed destination identification information. Since the phone number of the destination with the management ID "4" is "3456789012", information indicating the character string "3456789012" is determined as to-be-printed destination identification information. In this case, information indicating the character string "3456789012" is included in supplementary information, and, as illustrated in FIG. 7, a supplementary image including an image that represents the character string "3456789012" is printed in the header area 36.

Even in the case where information indicating the destination name is determined as to-be-printed destination identification information in accordance with the priority, if the destination name satisfies a specific condition, the determination unit 30 determines information indicating, instead of the destination name, the phone number as to-be-printed destination identification information.

For example, in the case where the number of characters included in a character string that represents the destination name determined as above exceeds a character limit in an area where to-be-printed destination identification information is printed in the header area 36, the destination name satisfies the specific condition. For example, in the case where the number of characters representing the destination name exceeds a predetermined threshold, the destination name satisfies the specific condition. In this case, the determination unit 30 determines information indicating the phone number of a destination selected by the fax sender as to-be-printed destination identification information. As for the threshold, the maximum number of characters printable in an area where to-be-printed destination identification information is printed in the header area 36 is determined in advance, and this maximum number is used as the threshold. For example, in the case where the threshold is 18 characters and the number of characters of the destination name exceeds 18 characters, as in the character string "DDDDDDDDDDDDDDDDDDD Corporation", the determination unit 30 determines information indicating the phone number of the destination selected by the fax sender as to-be-printed destination identification information. Since the number of characters of the above-mentioned character string is 31 characters, if the above-mentioned character string is printed in the header area 36, the first 18 characters from the beginning of the character string are printed, but the remaining 13 characters are not printed. Specifically, an image representing the character string "DDDDDDDDDDDDDDDDDDD" is printed in the header area 36, but an image representing the character string "Corporation" is not printed. A character string representing such a destination name is a character string unprintable as it is on paper. Even in the case where the number of characters of a character string representing a destination name exceeds a character limit and, as a result, the character string representing the destination name is unprintable as it is on paper, the phone number is printed instead of the destination name in the header area 36. In doing so, the user at the destination is able to know to whom the fax is sent. Note that the above-mentioned threshold may be changed by the sender of the fax or by another user.

In the case where the number of characters of a character string representing a destination name determined as described above is less than or equal to the above-mentioned threshold, the destination name does not satisfy the specific condition. In this case, a supplementary image including an image representing the destination name is printed in the header area 36.

In addition, in the case where character code of a character string representing a destination name determined as described above does not support character code used in fax sending, that is, in the case where glyph data associated with the character code is not stored in the memory 22, the destination name satisfies the specific condition. In this case, the determination unit 30 determines information indicating the phone number of a destination selected by the fax sender as to-be-printed destination identification information. For example, in the case where the character string of a destination name is the character string "DDDD T" and glyph data associated with the character code of the character "T" is not stored in the memory 22, the determination unit 30 determines that information indicating the phone number as to-be-printed destination identification information. If the character string "DDDD T" is printed in the header area 36, the character "T" is not printed as it is, and a different image is printed. For example, an image such as "■" is printed. The character string of such a destination name is a character string unprintable as it is on paper. Even in the case where the character code of a character string representing a destination name does not support the character code of fax sending, and, as a result, the character string representing the destination name is unprintable as it is on paper, the phone number is printed instead of the destination name in the header area 36. In doing so, the user at the destination is able to know to whom the fax is sent.

In the case where character code of a character string representing a destination name determined as described above supports character code used in fax sending, that is, in the case where glyph data associated with the character code is stored in the memory 22, the destination name does not satisfy the specific condition. In this case, a supplementary image including an image representing the destination name is printed in the header area 36.

Note that the destination name of a destination selected by the fax sender may sometimes not be registered in the destination management table. For example, there is a case in which only the phone number is registered, and the destination name is not registered. In such a case, in the case where the to-be-printed destination identification information of a destination selected by the fax sender is not registered in the destination management table, the determination unit 30 determines information indicating the phone number of the destination selected by the fax sender as to-be-printed destination identification information.

In the case where a destination name or a phone number is selected by the fax sender, the determination unit 30 may determine information indicating the destination name or the phone number selected by the fax sender as to-be-printed destination identification information. The fax sender may select to-be-printed destination identification information before the fax sender gives an instruction to execute fax sending, or after the fax sender gives an instruction to execute fax sending.

For example, in the case where the sender of a fax selects the destination (such as the destination with the management ID "4") of the fax from the destination table, if the to-be-printed destination identification information of the destination is not registered in the destination management table, the controller 28 causes the display of the UI unit 20 to display information for prompting the user to select to-be-printed destination identification information. The controller 28 causes the display to display information for prompting the user to select to-be-printed destination identification information, for example, before the fax sender gives an instruction to execute fax sending. As described above, since the destination name of a destination selected by the fax sender is sometimes not registered in the destination management table, if the destination name of a destination selected by the fax sender is registered in the destination management table, the controller 28 may cause the display to display information for prompting the user to select to-be-printed destination identification information.

FIG. 8 illustrates an example of information for prompting the user to select to-be-printed destination identification information. As illustrated in FIG. 8, for example, the screen 38 of the display displays a message for prompting the user to make that selection. For example, a message such as "To-be-printed destination identification information to be printed at destination is not registered in destination management table. Please select to-be-printed destination identification information." is displayed. In addition, the "destination name" and the "phone number" which are candidates for the to-be-printed destination identification information are displayed. A character string representing the destination name of a destination selected by the fax sender and a character string representing the phone number of the destination may be displayed on the screen 38. Since the destination with the management ID "4" is selected by the fax sender, the character string "DDDD" representing the destination name and the character string "3456789012" representing the phone number of the destination may be displayed on the screen 38.

In the case where the fax sender selects the "destination name" on the screen 38, the determination unit 30 determines information indicating the character string "DDDD" as to-be-printed destination identification information. The to-be-printed destination identification information indicating the character string "DDDD" is included in supplementary information, and, as illustrated in FIG. 6, a supplementary image including an image that represents the character string "DDDD" is printed in the header area 36.

In the case where the fax sender selects the "phone number" on the screen 38, the determination unit 30 determines information indicating the character string "3456789012" as to-be-printed destination identification information. The to-be-printed destination identification information indicating the character string "3456789012" is included in supplementary information, and, as illustrated in FIG. 7, a supplementary image including an image that represents the character string "3456789012" is printed in the header area 36.

Even in the case where the fax sender selects information indicating the destination name as to-be-printed destination identification information, if the destination name satisfies a specific condition, the determination unit 30 determines information indicating the phone number of the destination selected by the fax sender, instead of the destination name selected by the fax sender, as to-be-printed destination identification information.

For example, in the case where the number of characters of a character string representing a destination name selected by the fax sender exceeds a predetermined threshold, the determination unit 30 determines information indicating the phone number of the destination selected by the fax sender as to-be-printed destination identification information. In the case where the number of characters of characters of a character string representing a destination name selected by the fax sender is less than or equal to the threshold, information indicating the destination name is used as to-be-printed destination identification information.

In the case where the character code of a character string representing a destination name selected by the fax sender does not support character code used in fax sending, the determination unit 30 determines information indicating the phone number of the destination selected by the fax sender as to-be-printed destination identification information. In the case where the character code of a character string representing a destination name selected by the fax sender supports character code used in fax sending, information indicating the destination name is used as to-be-printed destination identification information.

In the case where to-be-printed destination identification information of a destination selected by the fax sender is not registered in the destination management table, the controller 28 may cause the display of the UI unit 20 to display information for prompting the user to select to-be-printed destination identification information after the fax sender gives an instruction to execute fax sending. For example, an instruction to execute fax sending is given by operating the UI unit 20 by the user. In this case, the message illustrated in FIG. 8 is displayed on the display, and to-be-printed destination identification information is selected by the fax sender.

In the case where information indicating the phone number of a destination selected by the fax sender is determined as to-be-printed destination identification information since the destination name satisfies the above-mentioned specific condition, the controller 28 may cause the display of the UI unit 20 to display information indicating these circumstances. FIG. 9 illustrates a display example of these circumstances. For example, a message such as "Destination name is unprintable as it is. Information to be printed is changed to destination's phone number." is displayed on the screen 38 of the display. When the fax sender presses an "OK" button on the screen 38, information indicating the phone number is confirmed as to-be-printed destination identification information. In the case where a "cancel" button is displayed on the screen 38 and the fax sender presses the "cancel" button, information indicating the phone number may not be confirmed as to-be-printed destination identification information, and information indicating the destination name may be confirmed as to-be-printed destination identification information. Needless to say, information indicating the phone number may be used as to-be-printed destination identification information without displaying the information illustrated in FIG. 9.

In some cases, information indicating a character string entered in the setting field of the phone number in the destination management table includes additional information other than the phone number.

For example, the character string "184" may sometimes be added to the phone number as information for not displaying the phone number of the fax sender (that is, the caller number) at the destination. Alternatively, the character string "186" may sometimes be added to the phone number as information for displaying the phone number of the fax sender (that is, the caller number) at the destination.

In addition, information for specifying a communication line to be used in fax sending may sometimes be added to the phone number. For example, the character string "<1>" is a character string for specifying communication line 1. The character string "42>" is a character string for specifying communication line 2. The character string "<3>" is a character string for specifying communication line 3.

Sometimes the character string "!" may be added to the phone number as information for giving an instruction to execute confidential transmission, which is the function of communicating with only a specific partner, in accordance with dual tone multi-frequency (DTMF) signaling.

In addition, the character string "S" may sometimes be added to the phone number as information for giving an instruction to execute password transmission, which is the function of sending a fax with password.

The above-mentioned additional information is added to the phone number by, for example, the sender of a fax or by another user. For example, the additional information is added at the head of a character string indicating the phone number.

In the case where information indicating a character string entered in the setting field of the phone number in the destination management table is determined as to-be-printed destination identification information, if the above-mentioned additional information is included in the character string, the supplementary image data generator 24 deletes the additional information from the character string, and generates to-be-printed destination identification information indicating only the phone number. The supplementary image data generator 24 generates supplementary image data representing supplementary information including to-be-printed destination identification information indicating only the phone number. Even in the case where the additional information has been deleted in order to generate to-be-printed destination identification information indicating only the phone number, the character string entered in the setting field of the phone number in the destination management table remains unchanged.

For example, it is assumed that the character string "184" for not displaying the phone number is added to the character string "0123456789" indicating the phone number, and the character string "1840123456789" is entered in the setting field of the phone number. In the case where information indicating a character string entered in the setting field of the phone number is determined as to-be-printed destination identification information, the supplementary image data generator 24 deletes the character string "184" from the character string "1840123456789" to generate the character string "0123456789". The supplementary image data generator 24 generates supplementary image data representing supplementary information including information indicating the character string "0123456789". As a result, an image representing the character string "184" is not printed in the header area 36, and a supplementary image including an image representing the character string "0123456789" is printed. The same applies to other additional information.

Figure 10:
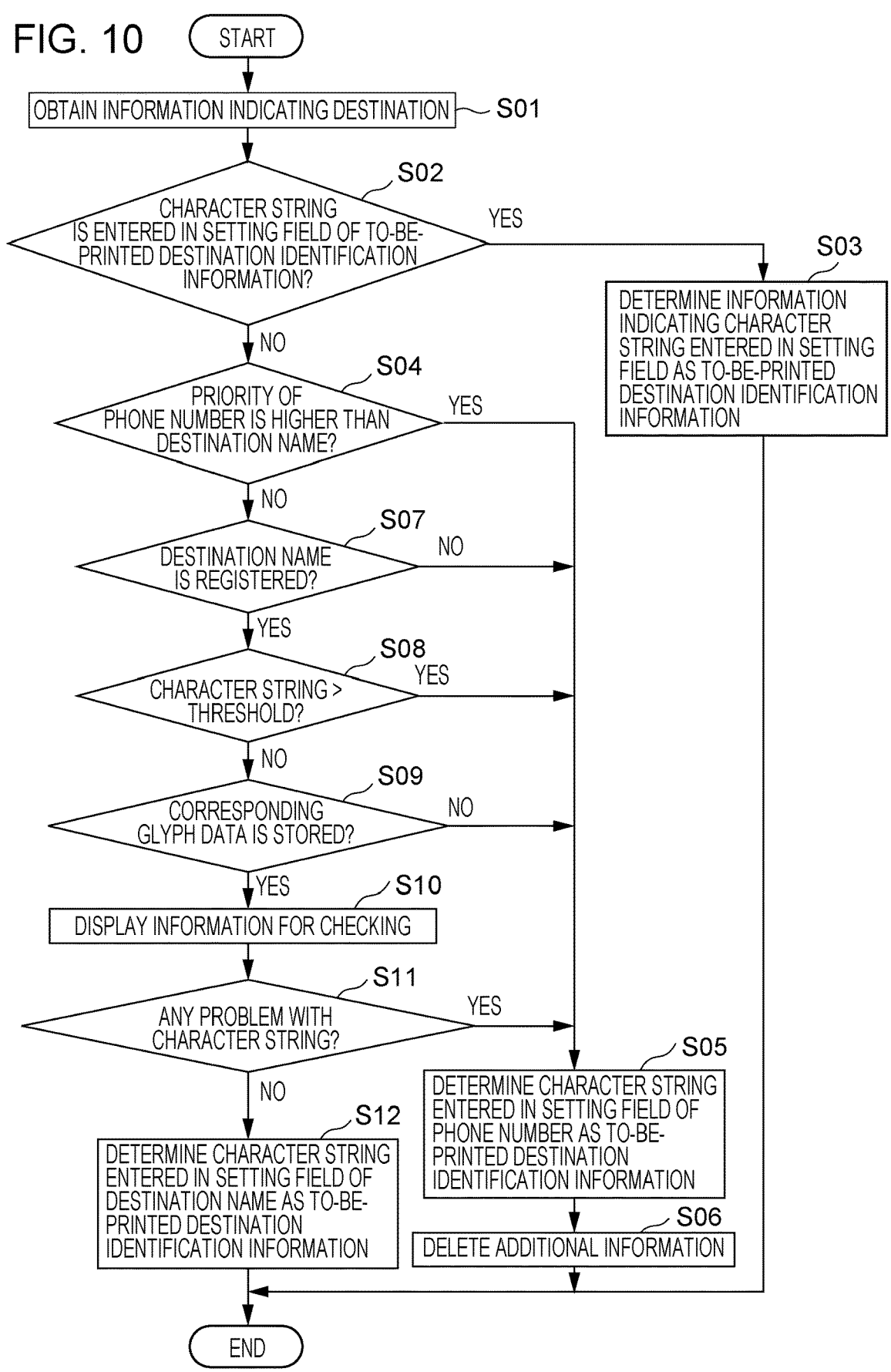
FIG. 10 is a flowchart illustrating a process performed by the image forming apparatus according to the present exemplary embodiment.

Hereinafter, a process performed by the image forming apparatus 10 will be described with reference to FIG. 10. FIG. 10 illustrates a flowchart indicating the process.

In the case where the fax sender selects, using the UI unit 20, the destination of a to-be-sent fax from the destination table illustrated in FIG. 4, the determination unit 30 obtains information (such as the management ID) indicating the destination selected by the fax sender (S01).

Next, the determination unit 30 refers to the destination management table stored in the memory 22. In the case where a character string is entered in the setting field of to-be-printed destination identification information of the destination selected as the destination of a to-be-sent fax (YES in S02), the determination unit 30 determines the character string entered in the setting field as to-be-printed destination identification information (S03).

In the case where no character string is entered in the setting field of to-be-printed destination identification information of the destination selected as the destination of a to-be-sent fax (NO in S02), the process proceeds to step S04. Here, by way of example, it is assumed that to-be-printed destination identification information is determined in accordance with a priority. In the case where the priority of a phone number is higher than the priority of a destination name (YES in S04), the determination unit 30 determines, in the destination management table, information indicating a character string entered in the setting field of the phone number of the destination selected by the fax sender as to-be-printed destination identification information (S05). In the case where additional information other than the phone number is added to this character string, the supplementary image data generator 24 deletes the additional information from the character string (S06).

Alternatively, to-be-printed destination identification information may be selected by the fax sender without using priority. In the case where information indicating the phone number is selected as to-be-printed destination identification information, the determination unit 30 may determine information indicating a character string entered in the setting field of the phone number of the destination selected by the fax sender in the destination management table as to-be-printed destination identification information (S05).

In the case where no character string is entered in the setting field of to-be-printed destination identification information of the destination selected as the destination of a to-be-sent fax (NO in S02), and the priority of a phone number is lower than the priority of a destination name (NO in S04), the process proceeds to step S07. In the case where information indicating the destination name is selected by the fax sender as to-be-printed destination identification information without using priority, the process proceeds to step S07.

In the case where no character string is entered in the setting field of the destination name of the destination selected by the fax sender in the destination management table (NO in S07), that is, in the case where the destination name of the destination is not registered in the destination management table, the determination unit 30 executes the process from step S05 onward.

In the case where a character string is entered in the setting field of the destination name of the destination selected by the fax sender in the destination management table (YES in S07), that is, in the case where the destination name of the destination is registered in the destination management table, the process proceeds to step S08.

In the case where the number of characters of the character string entered in the setting field of the destination name exceeds a threshold (YES in S08), the determination unit 30 executes the process from step S05 onward.

In the case where the number of characters of the character string entered in the setting field of the destination name does not exceed the threshold (NO in S08), the process proceeds to step S09.

In the case where glyph data associated with the character code of each character of the character string entered in the setting field of the destination name is not stored in the memory 22 (NO in S09), the determination unit 30 executes the process from step S0S onward.

In the case where glyph data associated with the character code of each character of the character string entered in the setting field of the destination name is stored in the memory 22 (YES in S09), the controller 28 causes the display of the UI unit 20 to display information for the fax sender to check if there is any problem with the character string entered in the setting field of the destination name (S10).

For example, FIG. 11 illustrates a display example of this case. A character string (such as the character string "DDDD") entered in the setting field of the destination name is displayed on the screen 38 of the display, and furthermore, a message such as "Would it be problem if character string entered in setting field of destination name is printed at destination?" is displayed.

In the case where the fax sender presses a "PROBLEM" button on the screen 38 (YES in S11), the determination unit 30 executes the process from step S05 onward.

In the case where the fax sender presses a "NO PROBLEM" button on the screen 38 (NO in S11), the determination unit 30 determines information indicating the character string entered in the setting field of the destination name as to-be-printed destination identification information (S12).

The supplementary image data generator 24 generates supplementary information including the to-be-printed destination identification information determined as described above, and generates supplementary image data representing the supplementary information.

The fax communication unit 12 sends fax data including the supplementary image data and to-be-sent image data via fax to the phone number of the destination selected by the fax sender.

In an apparatus at the destination of the sent fax, the printing unit 16 prints an image based on the fax data. The printing unit 16 prints, for example, as illustrated in FIG. 2, a to-be-sent image based on the to-be-sent image data in the to-be-sent image area 34 of the paper 32, and a supplementary image based on the supplementary image data in the header area 36. In the case where information indicating the destination name is selected as to-be-printed destination identification information in accordance with a priority or selection made by the fax sender, if the destination name satisfies a specific condition, as has been described above, supplementary image data is generated which includes information indicating the phone number of the destination in supplementary information. Therefore, the printing unit 16 of the apparatus at the destination prints a supplementary image including an image representing the phone number of the destination in the header area 36.

In the case where no character string is entered in the setting field of to-be-printed destination identification information of the destination selected as the destination of a to-be-sent fax, the controller 28 may enter a character string indicated by the to-be-printed destination identification information determined as above in the setting field. The controller 28 may cause the display of the UI unit 20 to display information for asking the user whether to enter the to-be-printed destination identification information. In the case where the user gives an instruction to enter the to-be-printed destination identification information, the controller 28 enters a character string indicated by the to-be-printed destination identification information in the setting field of to-be-printed destination identification information.

The functions of the elements of the above-described image forming apparatus 10 are realized by, for example, cooperation between hardware and software. Specifically, the image forming apparatus 10 includes one or more processors, such as central processing units (CPUs) (not illustrated). The functions of the elements of the image forming apparatus 10 are realized by reading and executing, by this one or more processors, a program stored in a storage device (not illustrated). The program is stored in the storage device via a recording medium such as a compact disc (CD) or a digital versatile disc (DVD) or via a communication channel such as a network. In another example, the functions of the elements of the image forming apparatus 10 may be realized by hardware resources such as a processor, an electronic circuit, or an application specific integrated circuit (ASIC). A device such as memory may be used in realizing the functions. In yet another example, the functions of the elements of the image forming apparatus 10 may be realized by a digital signal processor (DSP), a field programmable gate array (FPGA), or the like.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a sending unit that sends a fax to a destination; and
a controller that executes control for printing identification information for identifying the destination in accordance with a selection made by a sender of the fax on paper output at the destination in response to sending of the fax,
wherein, in a case where the sender of the fax selects a destination name as the identification information, if the destination name is unprintable as it is on the paper, the controller executes control for printing a phone number of the destination as the identification information on the paper.

2. The information processing apparatus according to claim 1, wherein selection of the identification information by the sender of the fax is executed in advance, before the sender of the fax gives an instruction to execute fax sending.

3. The information processing apparatus according to claim 1, wherein selection of the identification information by the sender of the fax is executed after the sender of the fax gives an instruction to execute fax sending.

4. The information processing apparatus according to claim 1, wherein, in a case where a number of characters included in a character string representing the destination name exceeds a character limit in an area where the identification information is printed on the paper, the controller executes control for printing a phone number of the destination as the identification information on the paper.

5. The information processing apparatus according to claim 1, wherein, in a case where character code of a character string representing the destination name does not support character code used in fax sending, the controller executes control for printing a phone number of the destination as the identification information on the paper.

6. The information processing apparatus according to claim 1, further comprising:
memory that stores a destination management table in which a setting field of the destination name, a setting field of a phone number of the destination, and a setting field of a to-be-printed destination identification information are associated with one another for each destination, wherein, in a case where the sender of the fax selects, as a destination of sending of the fax, a destination whose setting field of the to-be-printed destination identification information, is blank and selects the destination name as the identification information, if the destination name is unprintable as it is on the paper, the controller executes control for printing a phone number of the destination as the identification information on the paper.

7. An information processing apparatus comprising:

a receiving unit that receives data from a sending source via fax; and a printing unit that prints information based on the data on paper, wherein:

the data includes identification information for identifying a destination of sending of a fax, the identification information being selected by a sender of the fax, and in a case where the sender of the fax selects a destination name as the identification information, if the destination name is unprintable as it is on the paper, the printing unit prints a phone number of the destination as the identification information.

8. A non-transitory computer readable medium storing a program causing a computer to execute a process, the process comprising:

sending a fax to a destination; and executing control for printing identification information for identifying the destination in accordance with selection made by a sender of the fax on paper output at the destination in response to sending of the fax, wherein, in a case where the sender of the fax selects a destination name as the identification information, if the destination name is unprintable as it is on the paper, control is executed for printing a phone number of the destination as the identification information on the paper.

* * * * *